(No Model.)
C. J. HAUCK, Jr.
AGITATOR FOR LIQUIDS.
No. 427,473. Patented May 6, 1890.
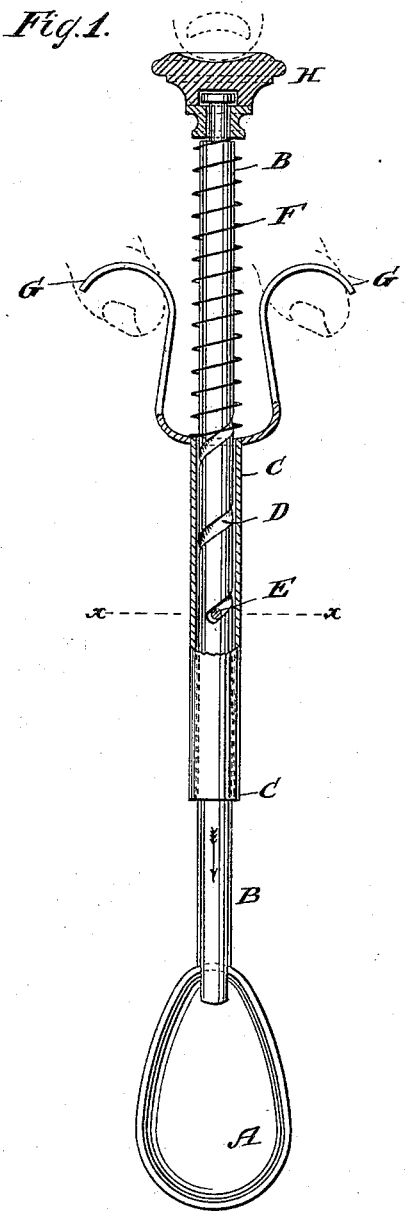
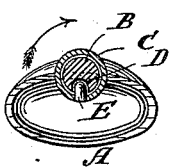
WITNESSES:
Edward Wolff
William L. Miller
INVENTOR:
Charles J. Hauck Jr.
BY
Van Santvoord & Hauff
his ATTORNEYS

UNITED STATES PATENT OFFICE.

CHARLES J. HAUCK, JR., OF BROOKLYN, NEW YORK.

AGITATOR FOR LIQUIDS.

SPECIFICATION forming part of Letters Patent No. 427,473, dated May 6, 1890.

Application filed February 8, 1890. Serial No. 339,725. (No model.)

*To all whom it may concern:*

Be it known that I, CHARLES J. HAUCK, Jr., a citizen of the United States, residing at Brooklyn, in the county of Kings and State of New York, have invented new and useful Improvements in Agitators for Liquids, of which the following is a specification.

This invention relates to improvements in agitators for liquids; and the invention consists in the details of construction set forth in the following specification and claim, and illustrated in the accompanying drawings, in which—

Figure 1 is a face elevation, partly in section, of an agitator. Fig. 2 is a section along $xx$, Fig. 1.

In the drawings, the letter A indicates the blade or body of the agitator, having a stem or shank B adapted to reciprocate in a sleeve C. A screw-thread D and stud E rotate the stem in its reciprocations. The screw-thread D is shown on the stem, and the stud E is shown fixed to the sleeve; but the stud may be fixed to the stem and the screw-thread formed on the sleeve. When the stem has been depressed and is released, a restoring-spring F returns the stem to its starting-point. Handles or ears G on the sleeve enable the sleeve to be held while the device is being operated. The stem B is shown provided with a head or finger-button H, which is rotatably secured to said stem, so that the stem can rotate, while the button does not partake of rotation. The device will be found serviceable in agitating liquids, such as mixed beverages.

What I claim as new, and desire to secure by Letters Patent, is—

An agitator composed of a body or blade having a stem or shank, a sleeve having a projecting handle, and in which the stem or shank reciprocates, a screw-thread and stud for rotating the stem or shank in its reciprocations, and a restoring-spring for the stem or shank, substantially as described.

In testimony whereof I have hereunto set my hand in the presence of two subscribing witnesses.

CHARLES J. HAUCK, JR.

Witnesses:
    J. VAN SANTVOORD,
    E. F. KASTENHUBER.